(12) United States Patent
Cook

(10) Patent No.: US 11,208,973 B2
(45) Date of Patent: Dec. 28, 2021

(54) APPARATUS AND METHOD TO IMPROVE VAPORIZATION OF FUEL IN INTERNAL COMBUSTION ENGINES

(71) Applicant: Watt If Consulting and Developing LLC, Bartow, FL (US)

(72) Inventor: Brian K. Cook, Lakeland, FL (US)

(73) Assignee: Watt If Consulting and Developing LLC, Bartow, FL (US)

( * ) Notice: Subject to any disclaimer, the term of this patent is extended or adjusted under 35 U.S.C. 154(b) by 227 days.

(21) Appl. No.: 16/524,897

(22) Filed: Jul. 29, 2019

(65) Prior Publication Data

US 2020/0355144 A1    Nov. 12, 2020

Related U.S. Application Data

(60) Provisional application No. 62/843,844, filed on May 6, 2019.

(51) Int. Cl.
| | | |
|---|---|---|
| *F01N 3/02* | (2006.01) | |
| *F02M 31/093* | (2006.01) | |
| *F02M 31/04* | (2006.01) | |
| *F01N 5/02* | (2006.01) | |

(52) U.S. Cl.
CPC ............ *F02M 31/093* (2013.01); *F01N 5/02* (2013.01); *F02M 31/045* (2013.01)

(58) Field of Classification Search
CPC ...... F02M 31/093; F02M 31/045; F01N 5/02; F01N 13/00; F01N 2240/02; F01N 3/0205
USPC .......................................................... 60/320
See application file for complete search history.

(56) References Cited

U.S. PATENT DOCUMENTS

| | | | | |
|---|---|---|---|---|
| 2,315,881 | A | | 4/1943 | Thomas |
| 3,032,023 | A | * | 5/1962 | Kruger ...................... F02M 1/00 123/545 |
| 3,395,681 | A | * | 8/1968 | Walker ................. F02M 25/089 123/522 |
| 3,741,180 | A | * | 6/1973 | Eichbaum ............... F02M 31/08 123/545 |
| 3,930,476 | A | * | 1/1976 | Koch ...................... F02M 27/02 123/545 |
| 4,030,457 | A | * | 6/1977 | Hawryluk ............ F02M 31/093 123/557 |
| 4,155,338 | A | * | 5/1979 | Geiger ................... F02M 31/08 123/547 |
| 4,155,339 | A | * | 5/1979 | Geiger ............... F02M 31/0805 123/547 |
| 4,230,081 | A | | 10/1980 | Meek |
| 4,259,937 | A | | 4/1981 | Elliott |
| 4,275,699 | A | | 6/1981 | Troglin |
| 4,318,384 | A | | 3/1982 | Moffett |
| 4,338,906 | A | * | 7/1982 | Cox ..................... F02M 31/093 123/545 |

(Continued)

*Primary Examiner* — Jason D Shanske
(74) *Attorney, Agent, or Firm* — McHale & Slavin, P.A.

(57) ABSTRACT

A system and method to improve the efficiency of an internal combustion engine by delivering an air/fuel mixture to the combustion chamber in a pure gaseous state. The system accepts an air/fuel mixture from a carburetor or injector which is placed into a vaporized state before entering the combustion chamber of the engine. An intake track capable of withstanding exhaust gas temperatures of an internal combustion engine is constructed and arranged to cause vaporization of fuel and inhibit the vaporization from condensing.

12 Claims, 2 Drawing Sheets

(56) References Cited

U.S. PATENT DOCUMENTS

| | | | |
|---|---|---|---|
| 4,398,523 A | | 8/1983 | Henson |
| 4,455,986 A | * | 6/1984 | Finken .................. F02M 31/18 |
| | | | 123/557 |
| 4,476,840 A | * | 10/1984 | Budnicki ............ F02M 31/093 |
| | | | 123/557 |
| 4,495,928 A | | 1/1985 | Cook |
| 4,583,512 A | | 4/1986 | Gardner et al. |
| 4,784,092 A | | 11/1988 | Pitti |
| 5,048,501 A | | 9/1991 | Smith et al. |
| 5,174,266 A | | 12/1992 | Evdokimo |
| 5,386,813 A | | 2/1995 | LeBlanc |
| 5,778,860 A | | 7/1998 | Garcia |
| 6,276,347 B1 | | 8/2001 | Hunt |
| 7,992,549 B2 | | 8/2011 | Loyd |
| 2006/0118069 A1 | * | 6/2006 | Snyder ............ F02M 35/10196 |
| | | | 123/54.4 |
| 2007/0044469 A1 | * | 3/2007 | Harada ................ F02M 31/093 |
| | | | 60/599 |
| 2007/0193549 A1 | * | 8/2007 | Chipperfield .............. F16J 9/28 |
| | | | 123/193.6 |
| 2011/0203560 A1 | * | 8/2011 | Wallace ................ F02M 31/18 |
| | | | 123/590 |
| 2011/0265770 A1 | * | 11/2011 | Malfa .................... F02B 23/08 |
| | | | 123/559.1 |
| 2017/0260935 A1 | * | 9/2017 | Johanning ............ F02M 31/087 |
| 2018/0171870 A1 | * | 6/2018 | Salek .................... F02D 19/066 |
| 2019/0017473 A1 | * | 1/2019 | Johanning .............. A61G 13/04 |

* cited by examiner

APPARATUS AND METHOD TO IMPROVE VAPORIZATION OF FUEL IN INTERNAL COMBUSTION ENGINES

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/843,844, entitled "APPARATUS AND METHOD TO IMPROVE VAPORIZATION OF FUEL IN INTERNAL COMBUSTION ENGINES", filed May 6, 2019. The contents of the above referenced application are incorporated herein by reference.

FIELD OF THE INVENTION

This invention is directed to the field of internal combustion engines and, in particular, to an apparatus and method to improve vaporization of fuel in internal combustion engines.

BACKGROUND OF THE INVENTION

It is well know that liquid gasoline does not burn; rather, gasoline vapor produced during evaporation burns. It is also well known that liquid gasoline does not have the same explosive power as gasoline vapor. For example, gasoline poured over a wood pile results in an explosive start in the presence of fuel vapors, while fuel that has not turned into a vapor burn on the outside of the wood pile with no explosive force.

Gasoline used as a fuel for internal combustion engines has more than 200 different compounds and a broad temperature range of boiling points, ranging from 95° F. to 400° F. When a conventional internal combustion engine is running on gasoline, the amount of time in-between combustion cycles is only a few milliseconds, which is insufficient for all the gasoline to vaporize to a dry state and mix with an air charge.

Prior art patents are directed to the vaporization of fuel that is then added to oxygen. For instance, U.S. Pat. No. 2,315,881 discloses a system wherein gasoline in its liquid phase is heated within a jacketed tank to generate a vapor at the top of the tank, and gasoline in its liquid phase and its vapor phase are withdrawn from the bottom and top to the float chamber of the carburetor and to the throat of the carburetor.

U.S. Pat. No. 4,398,523 discloses a device for improving the vaporization of fuel to increase fuel efficiency by heating the fuel to accomplish vaporization, and employs a special carburetor in combination with the carburetor existing on the engine.

U.S. Pat. No. 4,583,512 discloses a device for improving vaporization of fuel by feeding fuel to the intake manifold of an internal combustion engine. The structure of this patent heats a mixture of fuel and air to provide vaporization by a complicated carburetor requiring performance of a plurality of valves and other control means.

U.S. Pat. No. 5,386,813 discloses a system for vaporization of fuel wherein fuel is forced into a vaporization chamber by a first stage pump and out of the chamber by a second stage variable high speed pump employing twin, counter-rotating fans.

U.S. Pat. Nos. 5,386,813; 4,784,092; 5,048,501; 4,230,081; 4,495,928; 7,992,549; 6,276,347; 4,275,699; 5,778,860; 4,398,523 and 4,318,384 are directed to vaporizing or heating fuel only. Other fuel treatment devices relating to vaporizing fuel by heat are shown in U.S. Pat. Nos. 4,259,937, 4,784,092, 5,048,501, and 5,174,266.

What is lacking in the art is a device that improves the vaporization of the fuel when using a conventional air/fuel mixing carburetor or injector wherein the intake manifold is adaptable to take waste heat from the engine for increasing the vaporization of the air/fuel mixture.

SUMMARY OF THE INVENTION

This invention provides a gas vapor process and device for ambient air and fuel to be drawn into the intake manifold of an internal combustion engine, namely the intake track, which is an integral part of the exhaust manifold. In this embodiment, liquid gasoline is dried and becomes mixed with heated ambient air for maximum expansion of both air and fuel before entering the combustion chamber. The device treats only the fuel to be consumed within the following few milliseconds.

The gas vapor process delivers fuel and air to the combustion chamber in a true homogenous gaseous state. The gas vapor process positions the carburetor or injectors so as to allow the air and fuel charge to be directed to a heat exchanger, which is part of the intake track and exhaust manifold or muffler, where the fuel can dry and the air can heat to the point of sustaining the dry fuel without condensing back to a liquid. The vaporized fuel then blends with the air and is introduced into the cylinder combustion chamber.

The amount of liquid fuel delivered into the intake track may need to be reduced from the amount normal to supply a regular non-heated fueled engine.

It is noted that air-fuel ratios for internal combustion engines are currently calculated using air volume and liquid fuel weight, not dry fuel vapor. If only 50% of the liquid fuel can vaporize to a dry fuel within a few milliseconds, then the air-fuel ratio accounts for the parts that cannot vaporize to dry fuel and the liquid just continues to burn, producing heat but no power.

An objective of the invention is to disclose the use of conventional carburetors or fuel injectors constructed and arranged to provide an air and fuel ratio of 100% dry fuel. Micron sized particles of liquid gasoline do not mix with air.

Still another objective of the invention is to teach the use of an intake track interconnected with an engine exhaust, wherein the intake track can withstand exhaust temperatures and liquid fuel that come in contact with the interior walls of the intake track. The liquid fuel is boiled off and dried into a vapor, then mixed with the air that is passed through the intake track before being delivered to the cylinders of the internal combustion engine.

Yet still another objective of the invention is to teach the use of latent heat of vaporization for converting liquid fuel into a gaseous state.

Another objective of the invention is to make fuel more volatile by completely drying the fuel before it reaches the cylinders of an internal combustion engine, allowing a reduction in the amount of liquid fuel delivered, while still maintaining the correct air-fuel ratio of dry fuel in the combustion chamber.

Still another objective of the invention is to create a perfect air to fuel premixed gaseous state, making it possible to use less air and fuel and still achieve desired horsepower while improving fuel economy.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE INVENTION

Figure 1:
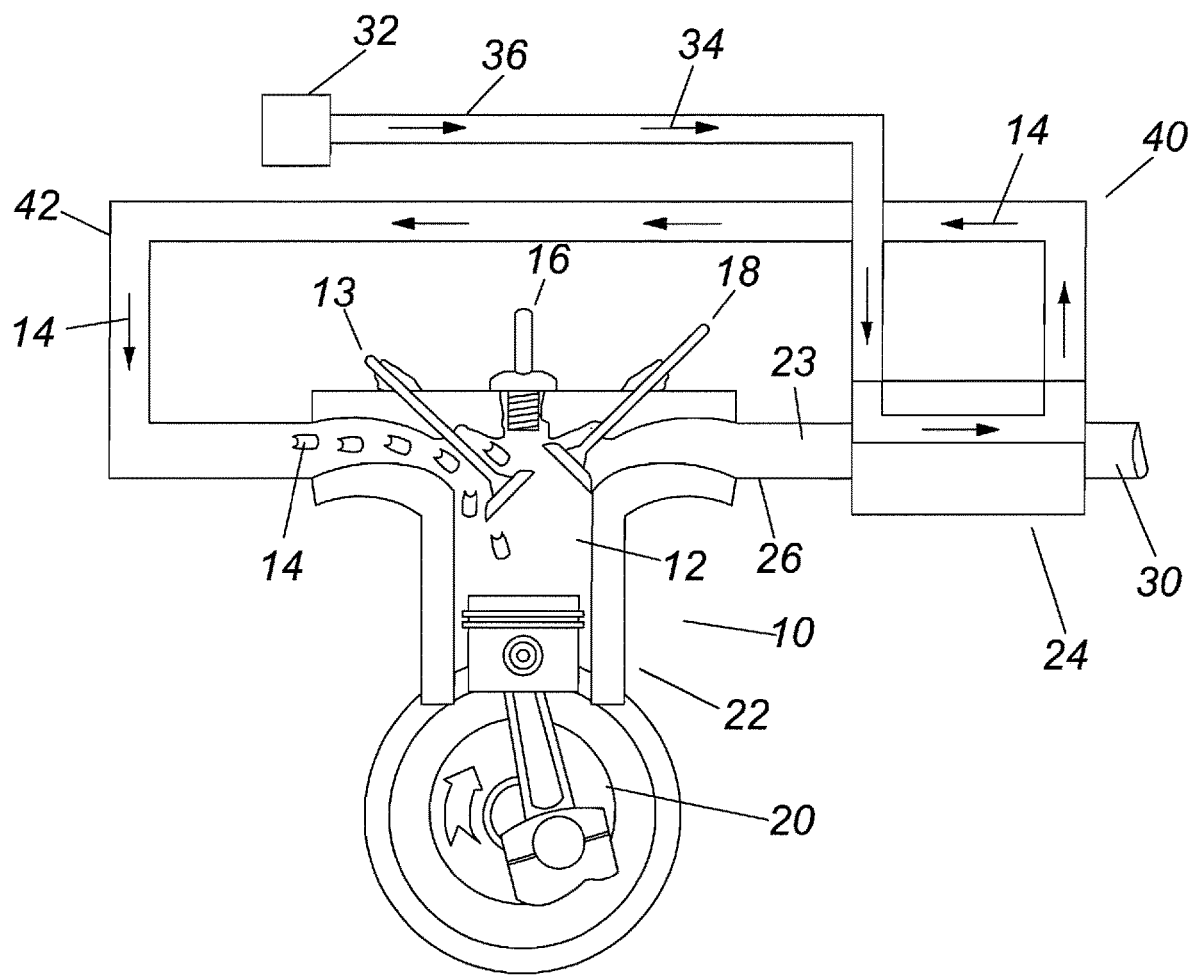
FIG. 1 is a flow schematic of the internal combustion engine intake.
Figure 2:
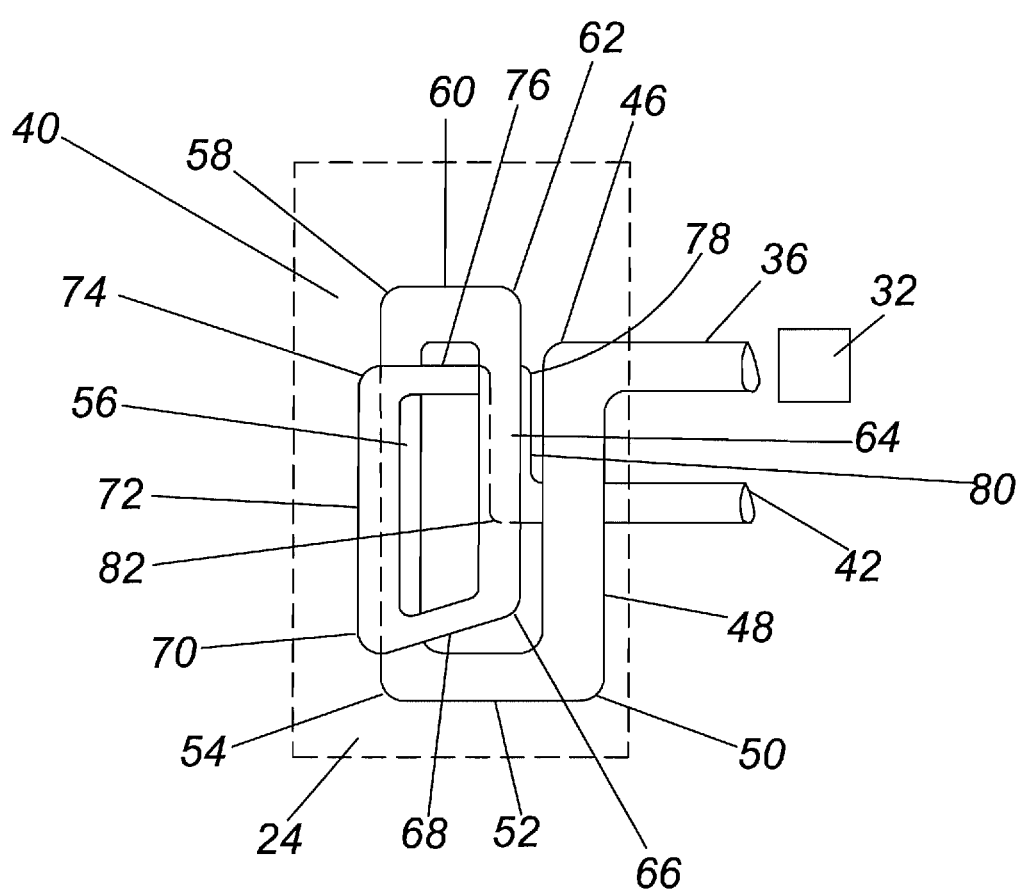
FIG. 2 is a plane view of the flow track within a muffler housing.

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Now referring to the drawings, disclosed is an apparatus and method to deliver an air/fuel mixture in a gaseous state for use in an internal combustion engine. The apparatus is used in combination with a conventional internal combustion engine 10 illustrated by a multi-stroke combustion chamber 12 employing at least one inlet valve 13 for receipt of an air/fuel mixture 14, a combustion chamber 12 with a spark plug 16, and at least one exhaust valve 18 to expel spent fuel from the combustion chamber 12. The combustion chamber operating in combination with the spark plug 16 to cause rotation of a crankshaft 20 by the timed movement of a piston 22

The spent fuel 23 is discharged through the use of the exhaust valve 18 and directed to a muffler 24 by an exhaust connector pipe 26. The muffler 24 is formed from a housing having a plurality of baffles to reduce resonant frequencies and other sound inducing waves to a level tolerable to environmental concerns. The muffler 24 is the first housing to receive spent fuel 23 which has been heated during the combustion process with latent heat formed in the muffler 24 before exhausting thought a discharge pipe 30.

In the preferred embodiment, a carburetor or injector 32 blends a predetermined amount of air and fuel into an air/fuel mixture 34 which is carried through an intake line 36 and delivered to an intake track 40 positioned within the muffler housing 24. The air/fuel mixture is electrically controlled and an amount of liquid fuel added to the injector is reduced upon fuel vaporization. The intake track 40 is attached to place in close proximity with the muffler housing 24 allowing the temperature of the air/fuel mixture 34 to become heated through conduction. The heated air/fuel mixture 14 is placed into a gaseous state before entrance to the combustion chamber 12. The intake track 40 must be of a material capable of withstanding maximum exhaust temperatures.

The vaporization process of the instant invention uses conventional metering of the air fuel mixture by the use of the carburetor 32 or any other means of metering, such as an injector. The air/fuel mixture 34 is introduced into the intake track 40 by the intake line 36 and then converted to a pure air/fuel 14 gaseous state. An extender portion 42 of the intake track 40 can be used to allow the intake track 40 to be positioned remotely from the engine 10. The extender portion 42 of the intake track 40 must be able to withstand full exhaust temperatures.

The intake track 40 includes a horizontally disposed entrance tube 36 for receipt of the air/fuel mixture 34 from the carburetor 32 and begins a track constructed and arranged to position a series of conductive tubes and elbows in close proximity to the muffler 24 of the internal combustion engine 10 calculated to provide a conductive heat source between 225° F. and 400° F. The intake track 40 comprises a first right angle elbow 46 directing the air/flow downwardly through a first vertically positioned conductor tube 48, a second right angle elbow 50 coupled to a second conductor tube 52 horizontally disposed, a third right angle elbow 54 coupled to a vertically disposed third conductor tube 56 extending upward to a height equal to or above the entrance tube 44, a fourth right angle elbow 58 coupled to a fourth horizontally disposed conductor tube 60, a fifth right angle elbow 62 coupled to a fifth vertically disposed conductor tube 64, a sixth right angle elbow 66 coupled to a sixth horizontally disposed conductor tube 68, a seventh right angle elbow 70 couple to a seventh vertically disposed conductor tube 72, an eighth right angle elbow 74 couple to a eighth horizontally disposed conductor tube 76, a ninth right angle elbow 78 couples to a ninth vertically disposed conductor tube 80, and a tenth right angle elbow 82 coupled to the extender tube 42 for delivering the vaporized air/fuel mixture to the combustion chamber 12.

While liquid fuel droplets are suspended in the air flow, the fuel droplets are inhibited by the right angle elbows. The liquid fuel that cannot make the turn comes in contact with the heated interior walls of the conductor tubes and elbows. Upon heating from the conductor tubes, the fuel boils off and is mixed with the air as the air rushes through the remainder of the intake track 40 before introduction into the cylinder combustion chamber 12. The intake track 40 can be of any reasonable length, from a few inches to multiple feet, and constructed of a material that can withstand full exhaust temperatures such as copper, aluminum, steel, or special plastics. Air itself is a poor conductor of heat so when the fuel contacts the heated surface of the intake track 40, the fuel boils very fast but does not get hot enough to self-combust because of the latent heat of evaporation. Nearing the boiling process, the liquid fuel will never get any hotter than its boiling point. High heat and fast boiling of a liquid does not mean a dry vapor; instead micron sized particles of liquid are released into the air. When the air and vaporized fuel are mixed before reaching the combustion chamber 12, the charge is more volatile and burns more complete.

Once in a gaseous state, the air/fuel mixture 14 moves as if it was just air; therefore the length of the intake track 40 is less important when using a gaseous fuel vs. liquid fuel. The carburetor or injector 32 used to regulate the quantity of fuel flowing to mix air in order to provide partial vaporization of the fuel, at which point the heat exchange of the intake track 40 vaporize the remaining portions of fuel that have very high boiling points. Fuel flow to the carburetor is reduced in response to the increased vaporization of the air/fuel mixture. It has been recognized that the greater the vaporization of the liquid fuels, the greater the combustion efficiency of the fuel.

In the preferred embodiment, the intake track 40 needs to have a heat exchange that can provide the necessary heat to raise the air temp to over 225° F.; between 275° F. to 400° F. being the optimum temperature. In this embodiment, air temperature readings would be higher at low RPMs and low power output. Air temperature readings would be lower at high RPMs and high power outputs because of air and fuel volume changes. Therefore, heat exchange needs to be designed for maximum power desired. Once stabilized the heat process self regulates based on average power output. For example based upon air flow, a 420 cc engine at 3600 RPMs and a mere 25% volumetric efficiency flows just over 3 liters of air per second.

Gasoline has an auto-ignition temperature of 536 degrees, and although the liquid fuel comes in contact with temperatures greater than that, the fuel itself does not get that hot, as the air temperature does not retain high heat. The air itself does not gain much heat from the hot intake track because it moves fast and is a poor conductor of heat. The fuel does not get hot enough to self-combust; it just boils off and dries, mixing with the cooler air. The intake track 40 inside the muffler 24 or the like exhaust manifold, is constructed and arranged to gain enough heat to cause the vaporization of gasoline and provide enough heat for air temps to elevate high enough to maintain a dry fuel state without condensing back to a liquid state.

Another example is a 2-cylinder 650 cc lawn tractor engine using a modified and heated intake track along with carburetor rejetting has had normal use since early 2014; the machine has been used with light loads to very heavy loads. The 650 cc engine runs and mows the same as with the original setup and uses 50% less fuel on average, while having no noticeable loss of power or usability. There is a name brand engine manufacturer that discloses fuel information showing savings between their carbureted engines vs. their fuel injected engines. Using their provided information, a 2 cylinder engine of comparable engine size of the 650 cc engine showed a carbureted engine using an average of about 2.7 ounces of fuel per minute, translating to 47 minutes of runtime per gallon. The fuel injected engine that they use for comparisons shows an average of about 2 ounces a minute, translating to 64 minutes of runtime per gallon. The 650 cc carbureted test engine has averaged just less than 1.3 ounces per minute, translating to 98 minutes of runtime per gallon.

Testing has shown that the carburetor itself can be downsized to a smaller size than original with no power loss or usability. When the air and vaporized fuel are mixed before reaching the cylinder, the charge is more volatile because it is then in a pure gaseous state. To demonstrate that liquid gasoline does not vaporize simply by spraying it into an airstream, a chamber was added to an exhaust manifold pipe less than inch away from the cylinder head, being 2 inches in length and 1 inch wide of a 670 cc engine, the manifold pipe being the floor of the chamber. Then, a second chamber was added as part of the intake track and run without the use of the modified intake track, whereas the exhaust manifold pipe and closely connected components reached temperatures in excess of 700° F. degrees under load. A second run was done using the modified intake track under a load with the air and fuel passing through the first chamber, and the connected track and the second chamber did not exceed 100° F. at the first chamber connected to the exhaust pipe. Immediately after shutdown, liquid gasoline was found puddling in the second chamber, which was about 12 inches downstream in the track.

This system has no starting problems, cold or warm. It starts like any other carbureted engine with a choke. When air/fuel is metered correctly and optimized for power, then turned into a gaseous state, the system receives optimum power and economy.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed:

1. An apparatus for improving the efficiency of an internal combustion engine having a multi-stroke combustion chamber employing at least one inlet valve for receipt of a metered air/fuel mixture and at least one exhaust valve for discharge of spent air/fuel mixture, said improvement comprising:

an intake track positioned between said metered air/fuel mixture and said inlet valve, said intake track comprises a first right angle elbow directing the air/flow downwardly through a first vertically positioned conductor tube, a second right angle elbow coupled to a second conductor tube horizontally disposed, a third right angle elbow coupled to a vertically disposed third conductor tube extending upward to a height equal to or above the entrance tube, a fourth right angle elbow coupled to a fourth horizontally disposed conductor tube, a fifth right angle elbow coupled to a fifth vertically disposed conductor tube, a sixth right angle elbow coupled to a sixth horizontally disposed conductor tube, a seventh right angle elbow coupled to a seventh vertically disposed conductor tube, an eighth right angle elbow coupled to a eighth horizontally disposed conductor tube, a ninth right angle elbow coupled to a ninth vertically disposed conductor tube, and a tenth right angle elbow coupled to an extender tube for delivering the vaporized air/fuel mixture to the combustion chamber, said intake track juxtapositioned to an exhaust interconnect;

wherein said air/fuel mixture is directed through said intake track and heated to a temperature above 225 degrees Fahrenheit for vaporization of liquid fuel.

2. The apparatus for improving the efficiency of an internal combustion engine according to claim 1, wherein said intake track is constructed to withstand the maximum exhaust temperature of the internal combustion engine and arranged to gain enough heat to cause said vaporization of the liquid fuel and maintain sufficient heat to maintain vaporization without condensing fuel back to a liquid state.

3. The apparatus for improving the efficiency of an internal combustion engine according to claim 1, wherein said air/fuel mixture is provided by a carburetor.

4. The apparatus for improving the efficiency of an internal combustion engine according to claim 3, wherein fuel flow to said carburetor is reduced in response to an increased vaporization of said air/fuel mixture.

5. The apparatus for improving the efficiency of an internal combustion engine according to claim 1, wherein intake track causing said air/fuel mixture vaporization is spaced apart from an internal combustion chamber.

6. The apparatus for improving the efficiency of an internal combustion engine according to claim 1, wherein said air/fuel mixture is provided by a fuel injector.

7. The apparatus for improving the efficiency of an internal combustion engine according to claim 6, wherein said air/fuel mixture is electrically controlled and an amount of liquid fuel added to said injector reduced upon fuel vaporization.

8. The apparatus for improving the efficiency of an internal combustion engine according to claim 1, wherein said air/fuel mixture is heated to 400 degrees F. and maintained at a temperature of above 225 degrees F. throughout said intake tract.

9. The apparatus for improving the efficiency of an internal combustion engine according to claim 1, wherein said air/fuel mixture departing said intake track is in a pure gaseous state.

10. The apparatus for improving the efficiency of an internal combustion engine according to claim 1, wherein said intake tract includes an elbow constructed and arranged to inhibit suspended liquid fuel droplets from passing until vaporization.

11. The apparatus for improving the efficiency of an internal combustion engine according to claim 1, wherein said intake track is constructed of a material capable of withstanding maximum exhaust temperatures produced by said internal combustion engine.

12. The apparatus for improving the efficiency of an internal combustion engine according to claim 1, wherein said intake track is juxtapositioned to an engine exhaust muffler.

\* \* \* \* \*